United States Patent
McCluskey

(10) Patent No.: US 9,891,422 B2
(45) Date of Patent: Feb. 13, 2018

(54) DIGITAL CONFOCAL OPTICAL PROFILE MICROSCOPY

(71) Applicant: Matthew D. McCluskey, Pullman, WA (US)

(72) Inventor: Matthew D. McCluskey, Pullman, WA (US)

(73) Assignee: Washington State University, Pullman, WA (US)

(*) Notice: Subject to any disclaimer, the term of this patent is extended or adjusted under 35 U.S.C. 154(b) by 883 days.

(21) Appl. No.: 14/018,604

(22) Filed: Sep. 5, 2013

(65) Prior Publication Data
US 2014/0071260 A1    Mar. 13, 2014

Related U.S. Application Data
(60) Provisional application No. 61/700,198, filed on Sep. 12, 2012.

(51) Int. Cl.
G02B 21/36    (2006.01)

(52) U.S. Cl.
CPC .......... *G02B 21/361* (2013.01); *G02B 21/36* (2013.01); *G02B 21/365* (2013.01)

(58) Field of Classification Search
None
See application file for complete search history.

(56) References Cited

U.S. PATENT DOCUMENTS

| | | | |
|---|---|---|---|
| 3,013,467 A | 12/1961 | Minsky | |
| 5,078,491 A * | 1/1992 | Johnston, Jr. | G01J 1/4257 356/121 |
| 6,072,625 A * | 6/2000 | Kitahara | G02B 21/0048 250/236 |
| 2005/0036667 A1* | 2/2005 | So | G06K 9/00127 382/128 |
| 2008/0018909 A1* | 1/2008 | Osaka | G01B 11/08 356/521 |
| 2010/0268042 A1* | 10/2010 | Wang | A61B 5/0059 600/322 |
| 2011/0237999 A1* | 9/2011 | Muller | A61F 9/008 604/20 |
| 2012/0188358 A1* | 7/2012 | Kimura | G02B 21/0092 348/79 |

OTHER PUBLICATIONS

M. Barth and E.H.K. Stelzer, "Boosting the optical transfer function with a spatially resolving detector in a high numerical aperture confocal reflection microscope," Optik 96, 53-8 (1994).
G. Boyer and V. Sarafis, "Two pinhole superresolution using spatial filters," Optik 112, 177-9 (2001).
(Continued)

*Primary Examiner* — Kevin McInnish
(74) *Attorney, Agent, or Firm* — Liang IP, PLLC

(57) ABSTRACT

Various embodiments of microscopy systems, devices, and associated methods of analysis are described herein. In one embodiment, a method of operating a microscope includes acquiring a profile of a light signal from a sample with a photo detector without passing the light signal through a physical pinhole. The method also includes determining a parameter of the sample based on generally the entire acquired profile of the light signal.

23 Claims, 3 Drawing Sheets

(56) References Cited

OTHER PUBLICATIONS

K. Carlsson, P.E. Danielsson, R. Lenz, A. Liljeborg, L. Majlof, and N. Aslund, "3-dimensional microscopy using a confocal laser scanning microscope," Optics Letters 10, 53-5 (1985).

M.A. Digman, C.M. Brown, P. Sengupta, P.W. Wiseman, A.R. Horwitz, and E. Gratton, "Measuring fast dynamics in solutions and cells with a laser scanning microscope," Biophysical Journal 89, 1317-27 (2005).

A.D. Dinsmore, E.R. Weeks, V. Prasad, A.C. Levitt, and D.A. Weitz, "Three-dimensional confocal microscopy of colloids," Applied Optics 40, 4152-9 (2001).

N.J. Everall, "Confocal Raman microscopy: Why the depth resolution and spatial accuracy can be much worse than you think," Applied Spectroscopy 54, 1515-20 (2000).

A. Gruber, A. Drabenstedt, C. Tietz, L. Fleury, J. Wrachtrup, and C. von Borczyskowski, "Scanning confocal optical microscopy and magnetic resonance on single defect centers," Science 276, 2012-4 (1997).

M.R. Heintzmann, V. Sarafis, P. Munroe, J. Nailon, Q.S. Hanley, and T.M. Jovin, "Resolution enhancement by subtraction of confocal signals taken at different pinhole sizes," Micron 34, 293-300 (2003).

J.R. Lawrence, D.R. Korber, B.D. Hoyle, J.W. Costerton, and D.E. Caldwell, "Optical sectioning of microbial biofilms," Journal of Bacteriology 173, 6558-67 (1991).

C.B. Müller and J. Enderlein, "Image scanning microscopy," Physical Review Letters 104, 198101:1-4 (2010).

S.M. Nie, D.T. Chiu, and R.N. Zare, "Probing individual molecules with confocal fluorescence microscopy," Science 266, 1018-21 (1994).

E. Sánchez-Ortiga, C.J.R. Sheppard, G. Saavedra, M. Martinez-Corral, A. Doblas, and A. Calatayud, "Subtractive imaging in confocal scanning microscopy using a CCD camera as a detector," Optics Letters 37, 1280-2 (2012).

C.J.R. Sheppard and C.J. Cogswell, "Confocal microscopy with detector arrays," Journal of Modern Optics 37, 267-9 (1990).

R. Tabaksblat, R.J. Meier, and B.J. Kip, "Confocal Raman microspectroscopy—theory and application to thin polymer samples," Applied Spectroscopy 46, 60-8 (1992).

A. Toriumi, S. Kawata, and M. Gu, "Reflection confocal microscope readout system for three-dimensional photochromic optical data storage," Optics Letters 23, 1924-6 (1998).

J.G. White, W.B. Amos, and M. Fordham, "An evaluation of confocal versus conventional imaging of biological structures by fluorescence light microscopy," Journal of Cell Biology 105, 41-8 (1987).

T. Wilson, R. Juškaitis, and P. Higdon, "The imaging of dielectric point scatterers in conventional and confocal polarisation microscopes," Optics Communications 141, 298-313 (1997).

* cited by examiner

DIGITAL CONFOCAL OPTICAL PROFILE MICROSCOPY

CROSS-REFERENCE TO RELATED APPLICATION(S)

This application claims priority to U.S. Provisional Patent Application No. 61/700,198, filed on Sep. 12, 2012.

GOVERNMENT INTERESTS

This invention was made with government support under DMR1004804 awarded by National Science Foundation. The government has certain rights in the invention.

BACKGROUND

Confocal microscopy is an optical technique commonly used to obtain detailed information about cells, tissues, microbial biofilms, and colloidal glasses. A confocal microscope typically includes an objective lens proximate a sample and a focusing lens proximate a screen with a pinhole. The confocal microscope collects in-focus light signals from the sample through the pinhole. As a result, out-of-focus signals are eliminated. As only light signals produced at and/or close to the focal plane of the objective lens can be detected, the image's optical resolution is much better than that of wide-field microscopes.

DETAILED DESCRIPTION

Figure 1:
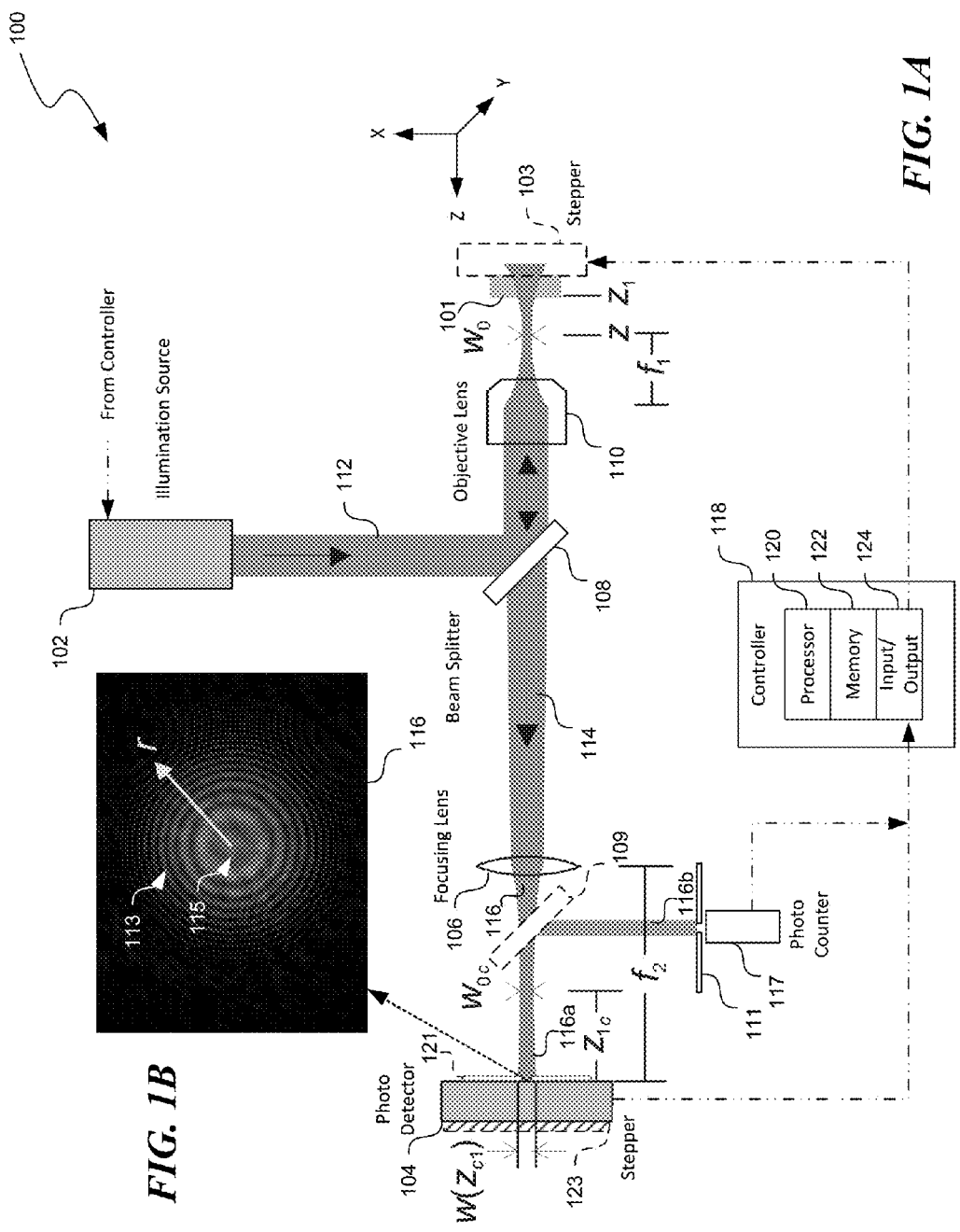
FIG. 1A is a partially schematic diagram of a digital confocal optical profile microscope in accordance with embodiments of the present technology.
FIG. 1B is an example photograph collected by the digital confocal optical profile microscope in FIG. 1A.

Various embodiments of digital confocal optical profile microscopy systems, devices, and associated methods of analysis are described below. Certain example digital confocal optical profile microscopy systems, devices, and methods are described below with particular components and operations for illustration purposes only. Other embodiments in accordance with the present technology may also include other suitable components and/or may operate at other suitable conditions. A person skilled in the relevant art will also understand that the technology may have additional embodiments, and that the technology may be practiced without several of the details of the embodiments described below with reference to FIGS. 1A-4.

As discussed above in the Background section, certain confocal microscopes can have higher optical resolutions than wide-field microscopes. However, such confocal microscopes have several drawbacks. For example, the pinhole in such confocal microscopes acts as an analog computer that applies a circular aperture function to light signals coming from the sample. The pinhole allows in-focus light signals to pass through but rejects out-of-focus signals, which may carry a great deal of information about the sample. As discussed in more detail below, several embodiments of the present technology monitor substantially the entire beam profiles of light signals from a sample. The monitored beam profiles can be modeled to yield additional and/or more accurate information about the sample than existing confocal microscopy.

FIG. 1A is a partially schematic diagram of a digital confocal optical profile microscope 100 in accordance with embodiments of the present technology. As shown in FIG. 1A, the digital confocal optical profile microscope 100 can include an illumination source 102, a photo detector 104, a focusing lens 106, a beam splitter 108, and an objective lens 110 operatively coupled to one another. In certain embodiments, the digital confocal optical profile microscope 100 can optionally include a stepper 103 configured to carry and move the sample 101 relative to the objective lens 110 along at least one of the x-, y-, or z-axis. The digital confocal optical profile microscope 100 can also include a controller 118 operatively coupled to the illumination source 102, the photo detector 104, and/or the optional stepper 103. In other embodiments, the stepper 103 may be omitted, and the digital confocal optical profile microscope 100 can further include scanning mirrors and/or other suitable optical components configured to focus illumination onto the sample 101 at a specific (x,y) location. In further embodiments, the digital confocal optical profile microscope 100 may also include frames, ocular lenses, diaphragms, and/or other suitable mechanical/optical components.

The illumination source 102 can include a laser, a light emitting diode, a halogen lamp, a fluorescent lamp, and/or other suitable types of light source configured to produce an illumination beam 112. Though not shown in FIG. 1A, the illumination source 102 can also include a collector lens, a field diaphragm, a condenser diaphragm, a condenser lens, and/or other suitable optical components configured to influence a profile of the illumination beam 112. For example, the illumination beam 112 may be manipulated to have a generally constant beam radius, as illustrated in FIG. 1A. In other examples, the illumination beam 112 may be manipulated to have a conical, parabolic, point, and/or other suitable profiles.

The beam splitter 108 is positioned to receive the illumination beam 112 from the illumination source 102. In certain embodiments, the beam splitter 108 is configured to direct the illumination beam 112 generally completely toward the sample 101 via the objective lens 110. In other embodiments, the beam splitter 108 may direct a portion of the illumination beam 112 toward the photo detector 104 and/or toward other suitable components (not shown) of the digital confocal optical profile microscope 100. The beam splitter 108 is also positioned to receive a reflected beam 114 from the sample 101 through the objective lens 110. The beam splitter 108 is then configured to direct the received reflected beam 114 toward the photo detector 104 via the focusing lens 106.

The beam splitter 108 can include a cube, plate, half-silvered mirror, dichroic mirrored prism, and/or other suitable components. In the illustrated embodiment, the focusing lens 106 and the photo detector 104 are shown in-line with the beam splitter 108 and the sample 101. In other embodiments, the focusing lens 106 and the photo detector 104 may be slanted with respect to the sample 101, and the beam splitter 108 may be configured to direct the reflected beam 114 along a suitable direction toward the focusing lens 106 and the photo detector 104. Even though the digital confocal optical profile microscope 100 is shown in FIG. 1A as having the beam splitter 108 for directing lights, in other embodiments, the beam splitter 108 may be substituted with one or more mirrors and/or other suitable optical components (not shown).

As shown in FIG. 1A, the objective lens 110 is positioned between the beam splitter 108 and the sample 101, and the focusing lens 106 is positioned between the beam splitter 108 and the photo detector 104. The objective lens 110 is configured to focus the illumination beam 112 onto the sample 101 as well as collect the reflected beam 114 from the sample 101. The focusing lens 106 is configured to focus the reflected beam 114 into a signal beam 116. The objective lens 110 and the focusing lens 106 can individually include a convex lens, a filter, and/or other suitable optical components. In one embodiment, the objective lens 110 and/or the focusing lens 106 may be stationary. In other embodiments, at least one of the objective lens 110 and the focusing lens 106 may be configured to move relative to each other and/or relative to the sample 101 along the z-axis.

In certain embodiments, the digital confocal optical profile microscope 100 does not include a physical pinhole between the photo detector 104 and the focusing lens 106. Instead, the photo detector 104 is positioned proximate the focusing lens 106 for directly detecting the signal beam 116. The photo detector 104 can include a charge coupled device ("CCD"), a complementary metal-oxide-semiconductor ("CMOS") photo sensor, a photodiode, and/or other suitable photo detectors. The photo detector 104 can have a detection area generally equal to or larger than a cross-sectional area of the signal beam 116 at the photo detector 104. For example, in the illustrated embodiment, the photo detector 104 has a detection area that is approximately five times larger than the cross-sectional area of the signal beam 116. In other embodiments, the photo detector 104 can have other suitable detection areas.

In other embodiments, the digital confocal optical profile microscope 100 may include a detector stepper 123 (shown in phantom lines for clarity) operatively coupled to the photo detector 104. The detector stepper 123 may be configured to move the photo detector 104 along at least one of the x-, y-, or z-axis such that the photo detector 104 is spaced apart from the focal plane of the focusing lens 106. As a result, a fraction of the detection area of the photo detector 104 filled by the signal beam 116 may be increased to a target value (e.g., about 0.1, about 0.2, about 0.3, about 0.4, about 0.5, about 0.6, about 0.7, about 0.8, about 0.9, or about 1.0). In other embodiments, the detector stepper 123 may be omitted, and the photo detector 104 may be off focus by, for example, positioning the focusing lens 106 or via other suitable techniques.

In further embodiments, the digital confocal optical profile microscope 100 may be configured to operate under a confocal mode and/or a confocal profile mode. In such implementations, the two modes may be operated independently or concurrently (e.g., in parallel). For example, the digital confocal optical profile microscope 100 may include a retractable pinhole 121 (shown in phantom lines for clarity). Under the confocal mode, the retractable pinhole 121 may be positioned between the photo detector 104 and the focusing lens 106 to filter or at least reduce out-of-focus signals. Alternately, under the confocal profile mode, the retractable pinhole 121 may be removed from the optical path between the photo detector 104 and the focusing lens 106. The photo detector 104 may then detect a profile of the signal beam 116 as described in more detail below.

In another example, the digital confocal optical profile microscope 100 may include an additional beam splitter 109 (shown in phantom lines for clarity) between the photo detector 104 and the focusing lens 106. The additional beam splitter 109 may be configured to direct a first portion 116a of the signal beam 116 to the photo detector 104 and a second portion 116b of the signal beam 116 to a pinhole 111 in front of a photo counter 117 (e.g., a photomultiplier tube or spectrometer). The first and second portions 116a and 116b of the signal beam 116 may be generally equal or may have other suitable proportions in intensity. The pinhole 111 may be positioned at or near a focus plane of the focusing lens 106. As a result, the photo counter 117 may detect only light signals produced at and/or close to the focal plane of the focusing lens 106. Thus, an optical resolution of resulting images may be much better than that of wide-field microscopes, and the resulting images may be utilized in conjunction with the detected profiles by the photo detector 104 to derive useful information regarding the sample 101. In further examples, the digital confocal optical profile microscope 100 may include mirrors, prisms, and/or other suitable configurations and/or components to be operated under the confocal mode and/or the confocal profile mode. In yet further examples, the additional beam splitter 109, the pinhole 111, and the photo counter 117 may be omitted.

As shown in FIG. 1A, the controller 118 can include a processor 120 coupled to a memory 122 and an input/output component 124. The processor 120 can include a microprocessor, a field-programmable gate array, and/or other suitable logic devices. The memory 122 can include volatile and/or nonvolatile computer readable media (e.g., ROM; RAM, magnetic disk storage media; optical storage media; flash memory devices, EEPROM, and/or other suitable non-transitory storage media) configured to store data received from, as well as instructions for, the processor 120. The input/output component 124 can include a display, a touch screen, a keyboard, a track ball, a gauge or dial, and/or other suitable types of input/output devices configured to accept input from and/or provide output to an operator.

In certain embodiments, the controller 118 can include a computer operatively coupled to other components of the digital confocal optical profile microscope 100 via a hard-wire communication link (e.g., a USB link, an Ethernet link, an RS232 link, etc.). In other embodiments, the controller 118 can include a logic processor operatively coupled to other components of the digital confocal optical profile microscope 100 via a wireless connection (e.g., a WIFI link, a Bluetooth link, etc.). In further embodiments, the controller 118 can include an application specific integrated circuit, a system-on-chip circuit, a programmable logic controller, and/or other suitable computing frameworks.

The operation of the digital confocal optical profile microscope 100 is described below with reference to embodiments without the optional beam splitter 109, pinhole 111, photo counter 117, or the retractable pinhole 121. However, one of ordinary skilled in the art would understand, other embodiments of the digital confocal optical profile microscope 100 with the foregoing components may be operated generally similarly as described below and/or with additional/different operations.

In operation, the controller 118 can cause the illumination source 102 to produce the illumination beam 112. The beam splitter 108 receives and directs the illumination beam 112 to the objective lens 110. The objective lens 110 then focuses the illumination beam 112 onto the sample 101. In response, the sample 101 reflects at least a portion of the focused illumination beam 112 as the reflected beam 114. The beam splitter 108 receives and directs the reflected beam 114 to the focusing lens 106, which focuses the reflected beam 114 into the signal beam 116. The photo detector 104 then detects and measures the signal beam 116 and provides an input signal to the input/output component 124 of the controller 118. In certain embodiments, the controller 118 can cause the illumination source 102 to turn off the illumination beam 112. Subsequently, the controller 118 can cause the optional stepper 103 to move the sample 101 along the x- and/or y-axis to a desired location. Then, the controller 118 may cause the illumination source 102 to turn on and the foregoing operations may be repeated until all desired locations have been traversed.

In one embodiment, the input signal corresponding to the signal beam 116 includes a digital photo of the signal beam 116. FIG. 1B shows an example digital photo that may be captured by the photo detector 104. As shown in FIG. 1B, the captured signal beam 116 includes a bright center 115 and a plurality of fringes 113 along a radial direction as indicated by the arrow r. In contrast, conventional confocal microscopes can only produce a detected light intensity through a physical pinhole. As discussed in more detail below, based on the profile of the captured signal beam 116, additional and/or more accurate information of the sample 101 may be obtained than conventional confocal microscopy.

Theoretical Background

Without being bound by theory, the following description is believed to provide a theoretical background for a better understanding of various aspects of the disclosed digital confocal microscopy. The applicants do not attest to the scientific truthfulness of the following description.

It is believed that when a light beam under-fills optical components, the light beam may be described by a spherical Gaussian beam. For example, referring to FIGS. 1A and 2, the illumination beam 112 is focused onto the sample 101 and a portion of which is reflected off an air/glass interface 132 located at $z_1$ to produce a first reflected Gaussian beam. The reflected beam 114 travels through the objective lens 110 and the focusing lens 106, and impinges on the photo detector 104. Assuming $z_{1c}$ equal to the distance from a detection plane of the photo detector 104 to a beam waist ($w_{0c}$) and r equal to a radial distance from the beam axis, up to an arbitrary phase factor, the electric field amplitude at the photo detector 104 is given by $$E(r) \propto \frac{1}{w(z_{1c})} \exp\left[-\frac{r^2}{w^2(z_{1c})}\right] \exp\left[-ik\frac{r^2}{2R(z_{1c})} + i\zeta(z_{1c})\right], \quad (1)$$

where $w(z_{1c})$ is a spot size, $R(z_{1c})$ is a wavefront radius of curvature, and $\zeta(z_{1c})$ is the longitudinal phase delay. The foregoing quantities are given by $$w(z_c) = w_{0c}\sqrt{1 + (z_c/z_{0c})^2}, \quad (2)$$

$$\frac{1}{R(z_c)} = \frac{z_c}{z_c^2 + z_{0c}^2}, \quad (3)$$

$$\zeta(z_c) = \tan^{-1}(z_c/z_{0c}). \quad (4)$$

$z_{0c}$ is the Rayleigh range, $$z_{0c} = w_{0c}^2 k/2 \quad (5)$$

where $k = 2\pi/\lambda$ and $\lambda$ is the wavelength of light.

Figure 2:
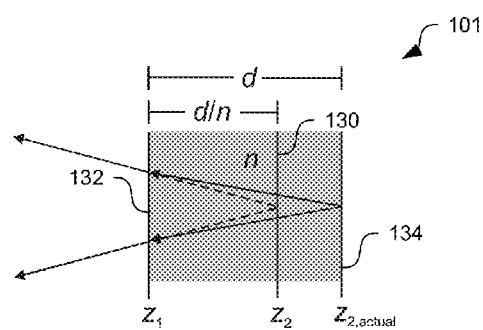
FIG. 2 is a schematic diagram illustrating details of a sample examined by the digital confocal optical profile microscope of FIG. 1A.

As shown in FIG. 2, light can also reflect from a second glass/air interface 134, located at $z_{2,actual}$ to produce a second reflected Gaussian beam. However, due to Snell's law, the light is bent to appear reflecting from an interface 130 at $z_2$, given by $$z_2 - z_1 = (z_{2,actual} - z_1)/n, \quad (6)$$

where n is the refractive index. For the purposes of modeling, $z_2$ was designated as the position of the second glass/air interface 130. Light that reflects from the second glass/air interface 130 is described by Eq. (1), with the "1" subscripts replaced by "2".

It is believed that the electric field at the photo detector 104 is a superposition of the first and second reflected Gaussian beams. As shown in FIG. 1A, the distances from the photo detector 104 to the beam waists are $z_{1c}$ and $z_{2c}$. From Eq. 1-4, the intensity of the combined first and second reflected Gaussian beams is given by $$I(r) = \frac{I_1}{w_1^2}\exp\left(-\frac{2r^2}{w_1^2}\right) + \frac{I_2}{w_2^2}\exp\left(-\frac{2r^2}{w_2^2}\right) + \frac{2\sqrt{I_1 I_2}}{w_1 w_2}\exp\left[-r^2\left(\frac{1}{w_1^2} + \frac{1}{w_2^2}\right)\right]\cos(\kappa r^2 + \delta), \quad (7)$$

where $$w_1 \equiv w(z_{1c}), \quad (8)$$

$$w_2 \equiv w(z_{2c}), \quad (9)$$

$$\kappa = \frac{k}{2}\left[\frac{1}{R(z_{1c})} - \frac{1}{R(z_{2c})}\right], \quad (10)$$

$$\delta = \tan^{-1}(z_{2c}/z_{0c}) - \tan^{-1}(z_{1c}/z_{0c}) + \delta_0, \quad (11)$$

and $\delta_0$ is the phase difference between the first and second reflected Gaussian beams due to different optical path lengths.

Variables with the subscript c refer to respective values at the photo detector 104, after the reflected beams have passed through the focusing lens 106. The foregoing quantities may be related to beam parameters ($z_0$ and $w_0$) at the sample 101. For example, if z denotes the position of the focal plane of the objective lens 110, then:

$$z_{1c,2c} = 2\frac{f_2^2}{f_1^2}(z_{1,2} - z), \quad (12)$$

$$z_{0c} = \frac{f_2^2}{f_1^2}z_0, \quad (13)$$

$$w_{0c} = \frac{f_2}{f_1}w_0. \quad (14)$$

Inserting these expressions into Eq. 8-11, and using Eq. 5 to relate the beam waist to the Rayleigh range, yields $$w_{1,2} = W_0\sqrt{1 + 4\frac{(z_{1,2} - z)^2}{z_0^2}}, \quad (15)$$

$$\kappa = \frac{2z_0}{W_0^2} \left[ \frac{z_1 - z}{4(z_1 - z)^2 + z_0^2} - \frac{z_2 - z}{4(z_2 - z)^2 + z_0^2} \right], \quad (16)$$

$$\delta = \tan^{-1}\left(2 \cdot \frac{z_2 - z}{z_0}\right) - \tan^{-1}\left(2 \cdot \frac{z_1 - z}{z_0}\right) + \delta_0, \quad (17)$$

where $W_0 = (f_2/f_1)w_0$.

Eq. 7 and Eq. 15-17 can be used to iteratively model image data of the signal beam 116 as a function of r and z based on the captured image until a substantial match is obtained. The adjustable parameters can include at least one of $I_1$, $I_2$, $W_0$, $z_0$, $z_1$, $z_2$, or $\delta_0$. From the modeling, positions of the interfaces, $z_1$ and $z_2$ may be extracted. The difference between $z_2$ and $z_1$ yields d/n, where d is the thickness of the sample 101 and n is the refractive index in Eq. (6). A process of analyzing image data of digital confocal optical profile microscope 100 is described in more detail below with reference to FIG. 4.

Experimental Setup

A confocal optical profile microscope generally similar to the configuration of the digital confocal optical profile microscope 100 shown in FIG. 1A was constructed. A continuous wave laser (Coherent Verdi, 532 nm wavelength, TEM$_{00}$ single mode, 2.25 mm diameter) was used as the illumination source. The laser beam was focused by an objective lens (Zeiss LD Plan-Neofluar, 20×, $f_1$=10 mm) onto a sample mounted on a manual xyz stage (Thorlabs). Reflected beam was focused by a focusing lens ($f_2$=250 mm) onto a CCD camera (Imaging Source DMK 21BU04, 640× 480 pixel array, 8 bit dynamic range) as the photo detector. An exposure time of 1/16 second was used. In this experiment, the sample was a glass microscope slide and images of the reflected beam were collected as a function of depth (z).

Experiment Procedures and Results

Using the manual xyz stage, the sample was translated in the −z direction in steps of 25.4 μm, equivalent to increasing a focal plane position z in 25.4 μm steps. A total of 39 images were captured; i.e., z varied from 0 to 25.4×38=965 μm. Each image was converted to a plot of average intensity versus r. The 39 intensity-versus-r plots are represented as a contour plot in FIG. 3. Spots of high intensity occur where the objective lens focuses light onto a glass/air interface. Fringes arise due to interference between the two reflected beams.

Figure 3:
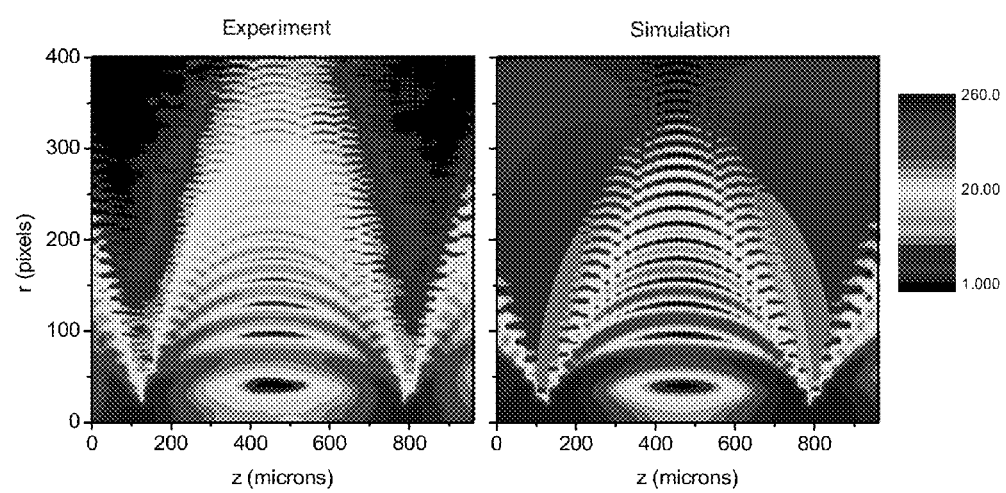
FIG. 3 illustrates experimental and simulation contour plots of reflected light intensity in accordance with embodiments of the present technology.

The data were simulated according to the model discussed above. As shown in FIG. 3, the simulation captures the major features of the experimental data. From the model, values of $z_1$=118 μm and $z_2$=795 μm were obtained, resulting in d/n=677 μm. For BK7 glass, n=1.5196 at a wavelength of 532 nm. The thickness of the glass slide was therefore 677×n=1029 μm, which was in agreement with that measured by a mechanical micrometer, to within ±1 μm.

Figure 4:
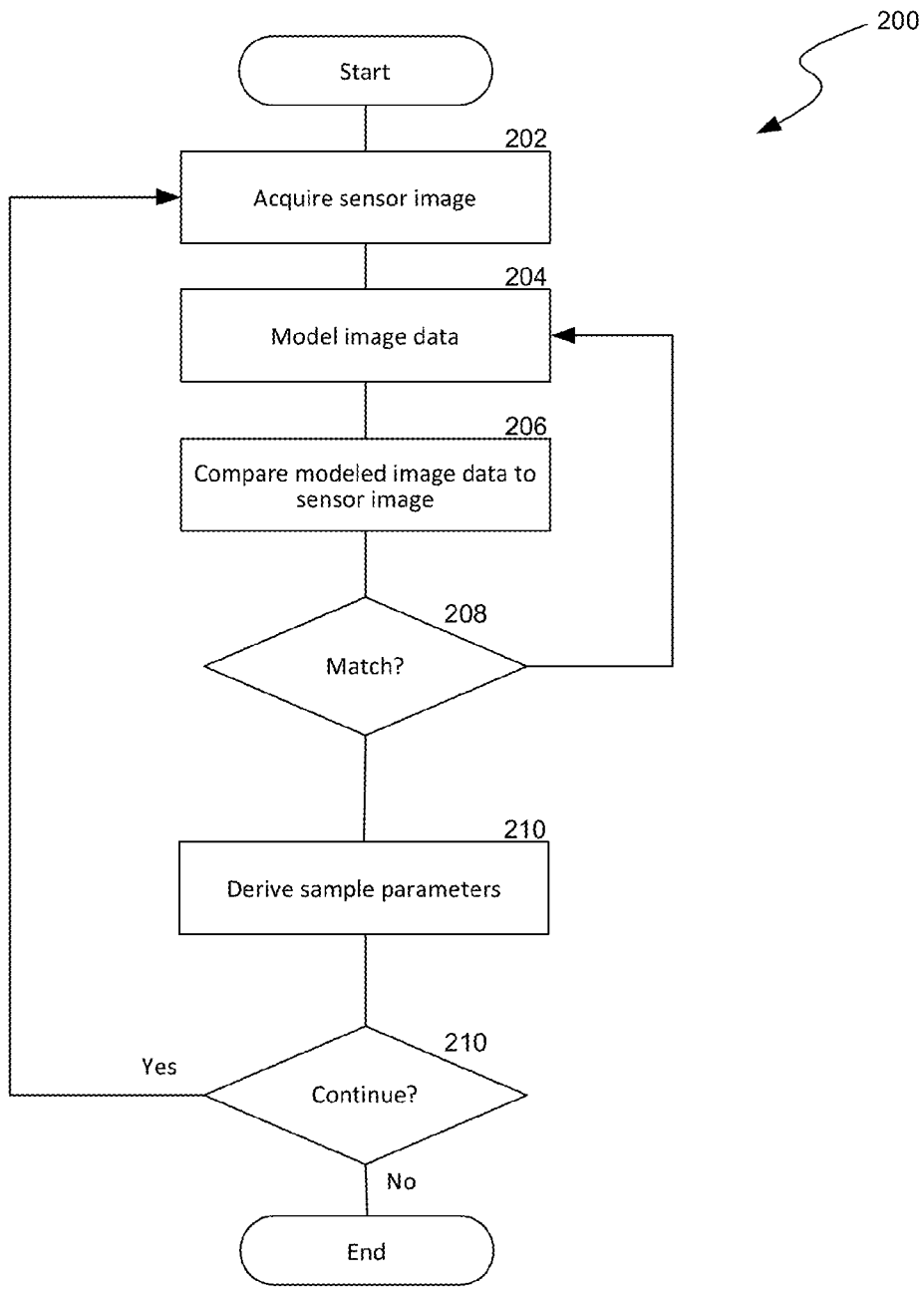
FIG. 4 is a flow chart illustrating a process of analyzing image data in a digital confocal optical profile microscope in accordance with embodiments of the present technology.

FIG. 4 is a flow chart illustrating a process 200 of analyzing image data in a digital confocal optical profile microscope in accordance with embodiments of the present technology. Even though the process 200 is described below with reference to the digital confocal optical profile microscope 100 of FIG. 1, one skilled in the art will recognize that several embodiments of the process 200 can also be implemented in other systems with similar or different system configurations.

As shown in FIG. 4, the process 200 includes acquiring sensor image at stage 202. In one embodiment, the sensor image (e.g., the example photograph shown in FIG. 1B) may be captured with a CCD, CMOS, photodiode, and/or other suitable photo sensors. In other embodiments, the sensor image may be acquired manually and/or via other suitable techniques. Another stage of the process 200 can include modeling image data as described above with reference to the Theoretical Background section. For example, in certain embodiments, at least one of $I_1$, $I_2$, $W_0$, $z_0$, $z_1$, $z_2$, or $\delta_0$ may be adjusted based on Eq. 7 and 15-17. In other embodiments, the image data may be otherwise suitably modeled.

The process 200 then includes comparing the modeled data to the acquired sensor image at stage 206 and determining if a match is found. In one embodiment, the modeled image data is deemed to match the captured image when the size of the center 115 (FIG. 1B) substantially matches (e.g., within a predetermined threshold). In another embodiment, the modeled image data is deemed to match the captured image when the size and/or spacing of the fringes 113 (FIG. 1B) substantially matches. If a match is not found, the process 200 reverts to modeling image data at stage 204 to further adjust at least one of $I_1$, $I_2$, $W_0$, $z_0$, $z_1$, $z_2$, or $\delta_0$. If a match is found, the process 200 continues to deriving sample parameters (e.g., positions of interfaces, $z_1$ and $z_2$) at stage 210. The process 200 then includes a decision stage 210 to determine if the process should continue. If yes, then the process 200 reverts to acquiring sensor image at stage 202; otherwise, the process ends.

Even though the process 200 is described above as being at least partially iterative, in other embodiments, parameters of the sample may be derived directly without iteration. For example, the acquired sensor image may be analyzed to derive an area of the center 115 (FIG. 1B), a spacing of the fringes 113 (FIG. 1B), and/or other suitable parameters of the sensor image. Subsequently, the derived parameters of the sensor image may be input into Eq. 7, 15-17, or other suitable combinations thereof to derive the parameters of the sample. In further examples, the parameters of the sample may be derived directly in other suitable fashion.

Several embodiments of the digital confocal optical profile microscope 100 and associated process 200 can produce additional and/or more accurate information about the sample 101 than conventional devices by capturing substantially the entire profile of the signal beam 116. For example, conventional devices with a physical pinhole cannot easily distinguish between light absorption by the sample 101 and a distance of the sample 101 relative to the objective lens 110. If the sample 101 absorbs a portion of the illumination beam 112, the sample 101 would appear to be farther away from the objective lens 110 because the measured light intensity at the pinhole would be low. In contrast, embodiments of the digital confocal optical profile microscope 100 capture not only the light intensity at the center of the signal beam 116, but also other characteristics of the signal beam 116. For example, it is believed that the area of the center 115 and the spacing of the fringes 113 are related to a position and thickness of the sample 101, respectively. As a result, more accurate information of the sample 101 may be obtained.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A microscope, comprising:
   an objective lens configured to collect a light signal from a sample;
   a focusing lens in a light path of the objective lens, the focusing lens having a focal plane and being configured to focus the collected light signal;

a photo detector proximate the focusing lens and configured to capture a profile of the focused light signal from the focusing lens, the photo detector including an array of pixels each configured to detect a light intensity value of the focused light signal impinging on the pixel to form a digital photograph of the profile, wherein the profile includes a center and one or more fringes extending radially from the center, and wherein an electric field of the profile is a superposition of first and second reflected Gaussian beams with an intensity I(r) given by:

$$I(r) = \frac{I_1}{w_1^2}\exp\left(-\frac{2r^2}{w_1^2}\right) + \frac{I_1}{w_2^2}\exp\left(-\frac{2r^2}{w_2^2}\right) + \frac{2\sqrt{I_1 I_2}}{w_1 w_2}\exp\left[-r^2\left(\frac{1}{w_1^2} + \frac{1}{w_2^2}\right)\right]\cos(\kappa r^2 + \delta),$$

where r is a radial distance from a beam axis of the first and second Gaussian beams, $I_1$ is intensity of the first Gaussian beam, $I_2$ is intensity of the second Gaussian beam;

$w_1 \equiv w(z_{1c})$ where $w_1$ is a beam waist of the first Gaussian beam at $z_{1c}$ which is a distance from a detection plane of the photo detector to the beam waist of the first Gaussian beam;

$w_2 \equiv w(z_{2c})$ where $w_2$ is another beam waist of the second Gaussian beam at $z_{2c}$ which is another distance from the detection plane of the photo detector to the another beam waist of the second Gaussian beam;

$$\kappa = \frac{k}{2}\left[\frac{1}{R(z_{1c})} - \frac{1}{R(z_{2c})}\right]$$

where $k=2\pi/\lambda$ and $\lambda$ is the wavelength of light, $R(z_{1c})$ is a wavefront radius of curvature at $z_{1c}$, and $R(z_{1c})$ is a wavefront radius of curvature at $z_{2c}$;

$\delta = \tan^{-1}(z_{2c}/z_{0c}) - \tan^{-1}(z_{1c}/z_{0c}) + \delta_0$ where $z_{0c}$ is a Rayleigh range and $\delta_0$ is a phase difference between the first and the second reflected Gaussian beams due to different optical path lengths; and a processor coupled to the photo detector and configured to receive the captured profile from the photo detector and determine a parameter of the sample based on the captured profile of the focused light signal.

2. The microscope of claim 1 wherein the photo detector is located at least approximately at the focal plane of the focusing lens.

3. The microscope of claim 1 wherein the photo detector is positioned to receive the focused light signal from the focusing lens without a physical pinhole.

4. The microscope of claim 1 wherein the photo detector is located at least approximately at the focal plane of the focusing lens, and wherein the photo detector has a detection area not smaller than a cross-sectional area of the focused light signal.

5. The microscope of claim 1 wherein the photo detector is located at least approximately at the focal plane of the focusing lens, and wherein the photo detector includes at least one of a charge coupled device, a complementary metal-oxide-semiconductor photo sensor, or a photodiode.

6. The microscope of claim 1, further comprising:
an illumination source configured to generate an illumination beam; and
a beam splitter configured to direct the illumination beam to the objective lens, and wherein
the objective lens is configured to focus the illumination beam onto the sample and to collect a reflected beam from the sample,
the beam splitter is further configured to receive the reflected beam from the objective lens and direct the reflected beam to the focusing lens; and
the focusing lens is configured to focus the reflected beam from the beam splitter into a signal beam; and
the photo detector being configured to detect the signal beam from the focusing lens.

7. The microscope of claim 6, further comprising a stepper configured to carry and move the sample relative to the objective lens along at least one of x-, y-, or z-axis relative to the objective lens.

8. The microscope of claim 6 wherein the beam splitter is a first beam splitter, and wherein the digital confocal microscope further includes:
a second beam splitter between the focusing lens and the photo detector;
a photo counter proximate the second beam splitter;
a physical pinhole between the second beam splitter and the photo counter, the physical pinhole is positioned at or near a focal plane of the focusing lens;
wherein the second beam splitter is configured to split the signal beam into a first portion toward the photo detector and a second portion toward the physical pinhole; and
wherein the photo counter is configured to detect a light intensity of the second portion of the signal beam.

9. A microscope, comprising:
an objective lens configured to collect a light signal from a sample;
a focusing lens configured to focus the collected light signal from the objective lens;
a photo detector configured to acquire a profile of the focused light signal from the focusing lens, the photo detector being spaced apart from a focal plane of the focusing lens and including an array of pixels each configured to capture a light intensity value of the focused light signal impinging on the pixel to form a digital photograph of the profile, wherein the profile includes a center and one or more fringes extending radially from the center, and wherein an electric field of the profile is a superposition of first and second reflected Gaussian beams with an intensity I(r) given by:

$$I(r) = \frac{I_1}{w_1^2}\exp\left(-\frac{2r^2}{w_1^2}\right) + \frac{I_1}{w_2^2}\exp\left(-\frac{2r^2}{w_2^2}\right) + \frac{2\sqrt{I_1 I_2}}{w_1 w_2}\exp\left[-r^2\left(\frac{1}{w_1^2} + \frac{1}{w_2^2}\right)\right]\cos(\kappa r^2 + \delta),$$

where r is a radial distance from a beam axis of the first and second Gaussian beams, $I_1$ is intensity of the first Gaussian beam, $I_2$ is intensity of the second Gaussian beam;

$w_1 \equiv w(z_{1c})$ where $w_1$ is a beam waist of the first Gaussian beam at $z_{1c}$ which is a distance from a detection plane of the photo detector to the beam waist of the first Gaussian beam;

$w_2 \equiv w(z_{2c})$ where $w_2$ is another beam waist of the second Gaussian beam at $z_{2c}$ which is another distance from the detection plane of the photo detector to the another beam waist of the second Gaussian beam;

$$\kappa = \frac{k}{2}\left[\frac{1}{R(z_{1c})} - \frac{1}{R(z_{2c})}\right] \quad (5)$$

where $k=2\pi/\lambda$ and $\lambda$ is the wavelength of light, $R(z_{1c})$ is a wavefront radius of curvature at $z_{1c}$, and $R(z_{1c})$ is a wavefront radius of curvature at $z_{2c}$;

$\delta = \tan^{-1}(z_{2c}/z_{0c}) - \tan^{-1}(z_{1c}/z_{0c}) + \delta_0$ where $z_{0c}$ is a Rayleigh range and $\delta o$ is a phase difference between the first and the second reflected Gaussian beams due to different optical path lengths; and a controller coupled to the photo detector, the controller including a processor and a computer readable medium storing instructions, when executed by the processor, causing the processor to:

receive the acquired digital photograph of the profile of the focused light signal from the photo detector; and analyze the received profile of the focused light signal in the digital photograph to determine a parameter of the sample based on the captured profile of the focused light signal.

10. The microscope of claim 9 wherein analyzing the received profile includes modeling image data for the light signal using at least one of the following:

$$w_{1,2} = W_0 \sqrt{1 + 4\frac{(z_{1,2} - z)^2}{z_0^2}}, \quad (15)$$

$$\kappa = \frac{2z_0}{W_0^2}\left[\frac{z_1 - z}{4(z_1 - z)^2 + z_0^2} - \frac{z_2 - z}{4(z_2 - z)^2 + z_0^2}\right], \quad (16)$$

$$\delta = \tan^{-1}\left(2 \cdot \frac{z_2 - z}{z_0}\right) - \tan^{-1}\left(2 \cdot \frac{z_1 - z}{z_0}\right) + \delta_0, \quad (17)$$

where $W_0 \equiv (f_2/f_1)w_0$.

11. The microscope of claim 10 wherein analyzing the received profile further includes adjusting at least one of $I_1$, $I_2$, $W_0$, $z_0$, $z_1$, $z_2$, or $\delta_0$.

12. The microscope of claim 10 wherein analyzing the received profile further includes adjusting at least one of $I_1$, $I_2$, $W_0$, $z_0$, $z_1$, $z_2$, or $\delta_0$ to obtain r and z.

13. The microscope of claim 10 wherein:
analyzing the received profile further includes adjusting at least one of $I_1$, $I_2$, $W_0$, $z_0$, $z_1$, $z_2$, or $\delta_0$ to obtain r and z; and
the method further includes comparing the obtained r and z to corresponding parameters on the acquired profile of the focused light signal from the photo detector.

14. The microscope of claim 10 wherein:
analyzing the received profile further includes adjusting at least one of $I_1$, $I_2$, $W_0$, $z_0$, $z_1$, $z_2$, or $\delta_0$ to obtain r and z; and
the method further includes comparing the obtained r and z to corresponding parameters on the acquired profile of the focused light signal from the photo detector; and
in response to that the obtained r and z do not match corresponding parameters on the acquired profile, readjusting at least one of $I_1$, $I_2$, $W_0$, $z_0$, $z_1$, $z_2$, or $\delta_0$ to obtain additional r and z.

15. The microscope of claim 10 wherein:
analyzing the received profile further includes adjusting at least one of $I_1$, $I_2$, $W_0$, $z_0$, $z_1$, $z_2$, or $\delta_0$ to obtain r and z; and
the method further includes comparing the obtained r and z to corresponding parameters on the acquired profile of the focused light signal from the photo detector; and
in response to that the obtained r and z do not match corresponding parameters on the acquired profile, readjusting at least one of $I_1$, $I_2$, $W_0$, $z_0$, $z_1$, $z_2$, or $\delta_0$ to obtain additional r and z until a match is found.

16. The microscope of claim 14 wherein a match is found when r and z are within a predetermined threshold of corresponding parameters on the acquired profile.

17. The microscope of claim 14, further comprising extracting positions of the interfaces $z_1$ and $z_2$ of the sample when a match is found.

18. The microscope of claim 14, further comprising extracting positions of the interfaces $z_1$ and $z_2$ of the sample when a match is found and calculating a thickness d based on the extracted $z_2$ and $z_1$ and a refractive index n of the sample.

19. A method of measuring one or more parameters of a sample using a microscope, comprising:
collecting and focusing a light signal from a sample with a focusing lens;
acquiring a digital photograph of a profile of the light signal with a photo detector without passing the light signal through a physical pinhole, the photo detector being spaced apart from a focal plane of the focusing lens and including an array of pixels each configured to detect a light intensity value of the focused light signal impinging on the pixel to form the digital photograph of the profile, wherein the profile includes a center and one or more fringes extending radially from the center, and wherein an electric field of the profile is a superposition of first and second reflected Gaussian beams with an intensity I(r) given by:

$$I(r) = \frac{I_1}{w_1^2}\exp\left(-\frac{2r^2}{w_1^2}\right) + \frac{I_2}{w_2^2}\exp\left(-\frac{2r^2}{w_2^2}\right) + \frac{2\sqrt{I_1 I_2}}{w_1 w_2}\exp\left[-r^2\left(\frac{1}{w_1^2} + \frac{1}{w_2^2}\right)\right]\cos(\kappa r^2 + \delta),$$

where r is a radial distance from a beam axis of the first and second Gaussian beams, $I_1$ is intensity of the first Gaussian beam, $I_2$ is intensity of the second Gaussian beam;

$w_1 \equiv w(z_{1c})$ where $w_1$ is a beam waist of the first Gaussian beam at $z_{1c}$ which is a distance from a detection plane of the photo detector to the beam waist of the first Gaussian beam;

$w_2 \equiv w(z_{2c})$ where $w_2$ is another beam waist of the second Gaussian beam at $z_{2c}$ which is another distance from the detection plane of the photo detector to the another beam waist of the second Gaussian beam;

$$\kappa = \frac{k}{2}\left[\frac{1}{R(z_{1c})} - \frac{1}{R(z_{2c})}\right]$$

where $k=2\pi/\lambda$ and $\lambda$ is the wavelength of light, $R(z_{1c})$ is a wavefront radius of curvature at $z_{1c}$, and $R(z_{1c})$ is a wavefront radius of curvature at $z_{2c}$;

$\delta = \tan^{-1}(z_{2c}/z_{0c}) - \tan^{-1}(z_{1c}/z_{0c}) + \delta_0$ where $z_{0c}$ is a Rayleigh range and $\delta o$ is a phase difference between the first and the second reflected Gaussian beams due to different optical path lengths; and determining a parameter of the sample based on the acquired digital photograph of the profile of the focused light signal.

20. The method of claim 19 wherein determining the parameter includes iteratively modeling image data of the light signal until the modeled image data converge with the acquired profile of the light signal.

21. The method of claim 19 wherein determining the parameter includes measuring parameters of the acquired profile of the light signal and deriving the parameter of the sample using the measured parameters.

22. The method of claim 19 wherein determining the parameter includes measuring at least one of an area of a center or a spacing of fringes of the acquired profile of the light signal and deriving the parameter of the sample using the measured parameters.

23. The method of claim 19 wherein determining the parameter includes measuring at least one of an area of a center or a spacing of fringes of the acquired profile of the light signal and deriving at least one of a distance or thickness of the sample using at least one of an area of a center or a spacing of fringes, respectively.

* * * * *